May 5, 1970     H. M. BERMAN     3,510,221
METHOD OF PHOTOGRAPHIC REPRODUCTION
Filed Aug. 26, 1968
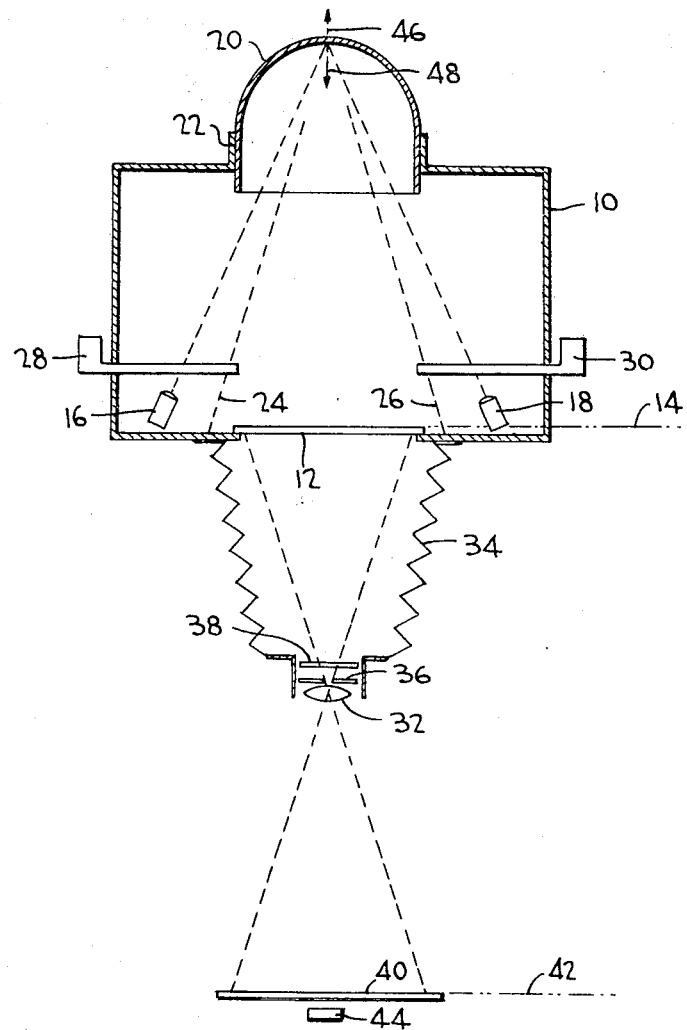
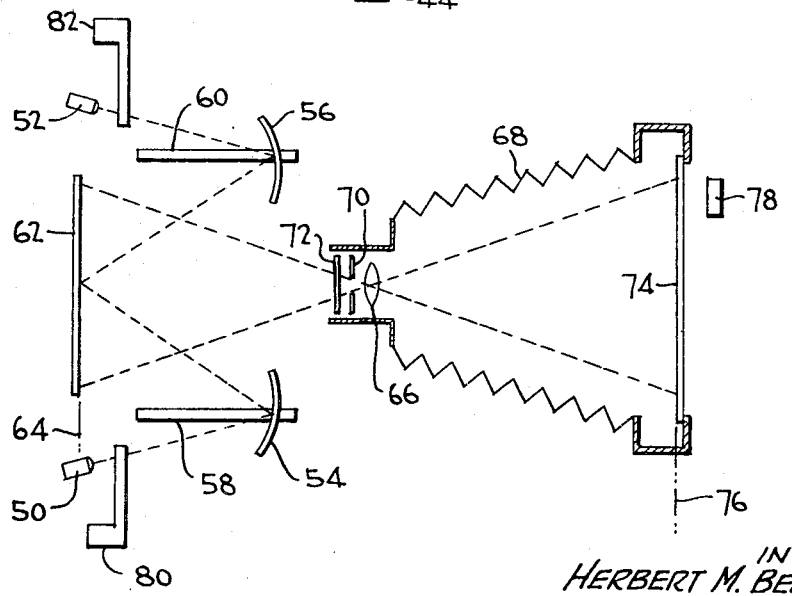
INVENTOR,
HERBERT M. BERMAN

United States Patent Office 3,510,221
Patented May 5, 1970

3,510,221
METHOD OF PHOTOGRAPHIC REPRODUCTION
Herbert M. Berman, New York, N.Y., assignor to Opti-Lume Corporation, New York, N.Y., a corporation of New York
Filed Aug. 26, 1968, Ser. No. 755,146
Int. Cl. G03b 27/76
U.S. Cl. 355—77                                            12 Claims

ABSTRACT OF THE DISCLOSURE

A method of photographic reproduction in which light of a constant controlled Kelvin temperature from a light source is reflected onto an adjustable curved screen and from the reflection screen either through a translucent original or reflected off an opaque original. The light next passes through a variable density filter, a lens aperture and a lens to the image plane. The highlight density is measured and the reflector adjusted until the desired highlight density is obtained. The shadow density is measured at the image plane and the filter is varied to correlate the shadow density to the highlight density as that desired and predetermined density range is achieved. A photographic emulsion is positioned at the image plane and exposed for a predetermined time.

BACKGROUND OF THE INVENTION

This invention relates to a method and apparatus for tightly controlling the Kelvin temperature of light while simultaneously allowing infinite variation of the light intensity at an image plane to insure the reproduction of a standard sensitometric curve as designed for a specific photographic emulsion and simultaneously to control finished constant end densities and contrast range on the emulsion.

The present invention has application to many photographic reproduction areas including document reproduction, photographic pictorial reproduction, infrared reproduction, X-ray duplication, microfilm reproduction, photographic paper prints, photographic dye transfers, movie film masters and duplicates, graphic arts color separations, and direct studio photography.

Light transmitted through a translucent photographic original copy or light reflected from an opaque photographic original copy is subject to a *law of infinite and varied densities*, at both the lightest and darkest areas of definition. The absolute last points of detailed definition are referred to as "density end points" and the arithmetical difference between the lightest and darkest point is known to be the density range. The quality of reproduction of all original and intermediate photographic copies is determined by this *law of infinite and variable end densities*.

Individual photographic emulsions respond properly only within a narrow density range. In emulsions used to reproduce colors the sensitometric curve usually responds properly only within a narrow Kelvin temperature range as well as within a narrow prescribed density range. Each emulsion, therefore, has its own plotted sensitometric curve indicating absolute end density points and density ranges to allow for maximum reproduction results and often requires a specific Kelvin light temperature for exposure. Thus, for correct utilization of a specific photographic emulsion the random variable end densities of originals must be controlled to a "standard."

In the past, the method for end point density control to the required sensitometric curve of a specific photographic emulsion utilizing a specific Kelvin temperature light source, has been computed on an individual exposure basis requiring an interpolation of the end densities of each specific original to the sensitometric curve of the emulsion.

This has required the use of many devices and techniques involving adjustments in lens diaphragm openings, exposure time variations and has required extra steps such as masking and premasking. The use of these devices and techniques required a great amount of skill on the part of a technician to arrive at the intended result. Due to uncertainties such as "emulsion reciprocity," "lens aberration" and 'interpolation computation error" multiple make-overs were common to achieve even compromised satisfactory results.

SUMMARY OF THE INVENTION

Accordingly, it is an object of the present invention to provide a method by which any specified Kelvin temperature may be easily achieved and maintained while simultaneously increasing and decreasing the intensity of illumination as required on the emulsion to be exposed and at the same time controlling both the high and low end densities to fit the specific sensitometric requirement of the emulsion.

A further object of the invention is to achieve these results and also eliminate a dependence for density readings to be taken of the original photographic copy.

Another object of the invention is to eliminate any possibility of emulsion reciprocity incurred by variable exposure times.

A further object of the invention is to reduce "lens aberration" and optical unsharpness by eliminating the necessity for using any areas of the lens other than the optimum.

Another object of the invention is to reduce the necessity for masking or premasking to protect highlight detail. A further object is to allow reproduction of detail in the "dark areas" of an original, known as "latent image" which is at present usually unreproducible.

Another object of the present invention is to utilize a curved reflective surface to provide soft, uniform, low contrast light in a method of photographic reproduction and to adjust the intensity of the light without changing the Kelvin temperature by moving the curved reflective surface.

Some of the advantages of the methods of the present invention over prior art methods are that soft, low contrast light is utilized to provide uniform intensity across the image plane eliminating hot spots or fall off, accurate detail reproduction, elimination of measurements to be taken at the copy plane, and the maintenance of required constant end densities and contrast range at the image plane.

The present invention is generally characterized in a method of photographic reproduction comprising the steps of providing light of adjustable intensity, directing the light to an original copy having highlight and shadow points and from the original copy through a variable neutral density filter to an image plane, measuring the light density at the image plane of the highlight point, adjusting the light intensity until a desired highlight point light density is obtained, measuring the light density at the image plane of the shadow point, adjusting the variable neutral density filter until a desired shadow point light density is obtained, positioning a photosensitive material at the image plane and exposing the photosensitive material to the light at the image plane.

Other objects and advantageous of the present invention will become apparent from the following description taken in conjunction with the accompanying drawings.

BRIEF DESCRIPTION OF THE DRAWINGS

FIG. 1 is a schematic elevational view of apparatus for use with a first embodiment of the present invention.

FIG. 2 is a schematic top plan view of apparatus for use with a second embodiment of the present invention.

DESCRIPTION OF THE PREFERRED EMBODIMENTS

Apparatus for use with the method of the present invention is shown in FIGS. 1 and 2, for obtaining photographic reproductions from translucent and opaque originals, respectively.

The apparatus of FIG. 1 includes a light tight housing 10 which has provision in its lower wall to accommodate a translucent original copy 12 to be reproduced, which original is disposed at a copy plane 14. Within the housing 10 are two or more light sources 16 and 18 which are mounted so as to be adjustable to a predetermined angle or position with respect to a curved reflection screen 20 to permit the light reflected therefrom to be set before commencing reproduction. While light sources 16 and 18 have been shown as directed toward the center of curved reflection sccreen 20, in practice it is desirable to direct the light sources off center in order to assure the provision of soft light by subjecting the light to a plurality of reflections within the reflection screen. Light sources 16 and 18 may be conventional photographic light sources capable of producing a temperature of up to 3600 degrees Kelvin. Reflection screen 20 may be constructed of any suitable reflecting material such as aluminum, glass or ceramics, or reflection screen 20 may have a painted or printed surface. In order to be movable, reflection screen 20 has a cylindrical body with a closed, curved top portion, and the cylindrical body is adapted to slide in an annular flange 22 of housing 10. It should be clear, however, that any suitable apparatus may be utilized to render the reflection screen movable or adjustable in a vertical direction.

The light reflected from reflection screen 20 overlaps the transparent original 12 as shown by dashed lines 24 and 26 and two Kelvin temperature meters 28 and 30 are positioned in the overlap area on either side of original 12 in order to sense the Kelvin temperature of the reflected light without casting a shadow on the original or obstructing the light transmitted therethrough. Meters 28 and 30 may be conventional and, while two meters have been shown, it is clear that one meter can suffice due to the soft, uniform, low contrast light provided by reflection screen 20.

An interchangeable lens 32 is disposed below transparent original 12 and may be secured in the end housing of a bellows 34 to be interchangeable. A lens diaphragm or aperture 36 is disposed immediately above or within lens 32 and has an opening range encompassing only the optimum quality area of lens 32. A variable neutral density filter 38 is disposed above aperture 36 and may be supported on spools so that by winding and unwinding the filter a varying density of approximately .01 to .8 may be presented. While filter 38 has been shown as disposed in the bellows above lens 32, it is clear that the filter can be disposed below the lens with equally acceptable results. It is understood that a timed shutter (not shown) will be utilized to control the passage of light through the apparatus for predetermined periods.

A photographically sensitive reproduction surface or emulsion 40 is disposed at an image plane 42 in order to receive the focused light from lens 32, and surface 40 may be supported by a base member attached to a stand which supports housing 10 to provide an integral support unit for the apparatus. A light meter 44 is depicted adjacent image plane 42 and may be a conventional photocell light meter.

To practice the method of the present invention light sources 16 and 18 are first subjected to voltage adjustment to assure that light of proper Kelvin temperature is being presented at copy plane 14. This is accomplished by reading meters 28 and 30 and adjusting the voltage applied to the light sources to increase or decrease the transmitted Kelvin temperatures by a standard voltage control, such as a potentiometer. The angles or positions of the light sources should also be adjusted to assure that they are directed toward the prescribed positions on reflection screen 20 to thereby provide soft, low contrast, uniform light with virtually no "fall off."

The light from light sources 16 and 18 is directed onto reflection screen 20 so that the reflected light is transmitted through the translucent original 12 at the copy plane, and the light is further directed through filter 38, aperture 36 and the optimum quality area of lens 32 to image plane 42. At image plane 42 the highlight density of the original copy is measured with meter 44, and reflection screen 20 is then accordingly moved top or down as shown by arrows 46 and 48 to decrease or increase the light, respectively. The amount of light required is dependent on the photographic emulsion 40 to be utilized at image plane 42, and reflection screen 20 is moved until the required highlight density is obtained. It may be required to adjust the angle of light sources 16 and 18 in order to assure the provision of soft, uniform, low contrast light from the reflection screen.

The shadow density of the light at the image plane may then be measured with meter 44, and filter 36 is then varied to obtain the correct shadow density. Since varying filter 36 changes the highlight density, filter 36 will be varied to overshoot the desired shadow density. After filter 36 is set, reflection screen 20 is readjusted to compensate for the effect on the highlight density of the variance of filter 36, and normally filter 36 will not have to be varied again due to the overshoot in the initial adjustment of the shadow density. Thus, filter 36 has been varied to correlate the shadow density with the highlight density.

After the highlight and shadow densities have been adjusted, a photosensitive material containing the photographic emulsion is positioned at the image plane and the shutter is opened for a predetermined exposure time.

The apparatus of FIG. 2 includes two light sources 50 and 52 disposed so as to be movable to permit adjustment of the light directed therefrom. Light sources 50 and 52 should have the same characteristics as light sources 16 and 18 of the embodiment of FIG. 1; that is, they should be capable of achieving a Kelvin temperature of up to 3600 degrees and have intensities variable with applied voltage. Two curved reflection screens 54 and 56 are disposed in front of light sources 50 and 52, respectively, and the reflection screens may be connected together so that movement along a pair of parallel tracks 58 and 60 may be simultaneous. Thus, reflection screens 54 and 56 may be considered as a reflector unit; however, it is realized that reflection screens 54 and 56 may be moved individually along tracks 58 and 60 independent of one another. An opaque original 62 is disposed at a copy plane 64 in such a position as to receive the soft, uniform, low contrast light reflected from the reflector unit.

An interchangeable lens 66 is disposed directly in front of the opaque original in the end housing of a bellows 68 and a lens diaphragm or aperture 70 is disposed behind or within lens 66 and has an opening range encompassing only the optimum areas of lens 66. A continuously variable neutral density filter 72 is disposed in front of lens 66 and may be supported on spools so that by winding and unwinding the spools, the density of the filter may be varied. It is clear that filter 72 may be placed behind lens 66 without adverse effects. A conventional timed shutter (not shown) may be utilized to control the exposure of the transmitted light.

A photographically sensitive material or emulsion 74 is disposed in an image plane 76 and is enclosed in a suitable light tight housing including bellows 68 open only to the controlled light from copy plane 64. A light meter such as a photocell 78 is positioned adjacent image plane 76. A pair of Kelvin temperature meters 80 and 82 are disposed so as to sense the Kelvin temperatures of the light produced by light sources 50 and 52.

As explained with respect to the embodiment of FIG. 1, light sources 50 and 52 may be adjusted after reading Kelvin temperature meters 80 and 82. Meters 80 and 82 have been shown as extending only into the direct path of light from the light sources; however, it is clear that these meters may be utilized in the same manner as meters 28 and 30 of FIG. 1 to sense the reflected light from the reflector unit in an overlapping area with respect to opaque original 62. Light sources 50 and 52 should also be adjusted to assure that they are directed to the predescribed position on reflection screens 54 and 56 so that the soft, low contrast, uniform reflected light is maintained, and to this end it is noted that the light sources may be directed at the reflectors off center.

The light from light sources 50 and 52 is directed to the reflector unit, and the light is then reflected from the opaque original 62 through filter 72, the selected aperture of lens diaphragm 70 and lens 66 to image plane 76. At the image plane the highlight density of the light is measured with meter 78 and the reflector unit is accordingly adjusted along tracks 58 and 60 to increase or decrease the light intensity as required. The required light intensity is dependent on the photographic emulsion 74 to be utilized at image plane 76, and the reflector unit is moved until the required highlight density is obtained. Movement of the reflector unit may require adjustment of the angle or position of the light sources in order to maintain the soft, uniform, low contrast light.

The shadow density of the light at the image plane may then be measured with meter 78 and filter 72 is then varied to obtain the correct shadow density. Since varying filter 72 changes the highlight density, filter 72 will be varied to overshoot the desired shadow density. After filter 72 is set, the reflector unit is readjusted to compensate for the effect on the highlight density of the variance of filter 72, and normally filter 72 will not have to be varied again due to the overshoot in the initial adjustment of the shadow density. Thus, filter 72 has been varied to correlate the shadow density with the highlight density.

After the highlight and shadow densities have been adjusted, a photosensitive material containing the photographic emulsion is positioned at the image plane and the shutter is opened for a predetermined exposure time.

While apparatus for practicing the method of the present invention has been shown in FIGS. 1 and 2 as including a reflection screen, it should be clear that the use of a reflection screen to provide soft, uniform, low contrast light is merely the best mode of carrying out the present invention and that any suitable means of adjusting light intensity may be utilized with the present invention with the realization that the many advantages attendant the use of a reflection screen will not be obtained.

Since the present invention is subject to many changes in detail, variations, and modifications it is intended that all subject matter described or shown in the drawings be interpreted as illustrative and not in a limiting sense.

What is claimed is:

1. A method of photographic reproduction comprising the steps of
   providing a light source capable of achieving a Kelvin temperature up to 3600 degrees;
   adjusting said Kelvin temperature as transmitted from said light source;
   directing said adjusted light onto a movable, curved, reflective surface so that said light is transmitted through a translucent photographic original, having recognizable highlight and shadow point areas, at a copy plane, and through a variable neutral density filter and a lens having a preset aperture range, encompassing only the optimum quality area of the lens, onto an image plane;
   measuring the highlight density point of said light on said image plane;
   adjusting said movable reflective surface until a meter reading, based on a selected photographic emulsion, is reached;
   measuring the shadow density point of said light on said image plane;
   correlating said shadow density point reading with said highlight density point reading by adjusting said variable density filter;
   positioning a photosensitive material, containing said photographic emulsion, on said image plane; and
   activating a single standard exposure time based on said emulsion.

2. The method as recited in claim 1 wherein said correlating step includes readjusting said reflective surface to compensate for the effect on said highlight density point of said adjusting of said variable density filter.

3. A method of photographic reproduction comprising the steps of
   providing a light source capable of achieving a Kelvin temperature up to 3600 degrees;
   adjusting said Kelvin temperature as transmitted from said light source;
   directing said adjusted light onto a movable, curved, reflective surface so that said light is reflected from an opaque photographic original at the object plane having recognizable highlight and shadow point areas, and through a continuously variable neutral density filter and a lens having a preset aperture range encompassing only the optimum quality area of the lens, onto an image plane;
   measuring the highlight density point of said light on said image plane;
   adjusting said movable reflective surface until a meter reading, based on a selected photographic emulsion, is reached;
   measuring the shadow density point of said light on said image plane;
   correlating said shadow density point reading with said highlight density point reading by adjusting said variable density filter;
   positioning a photosensitive material, containing said photographic emulsion, on said image plane; and
   activating a single standard exposure time based on said emulsion.

4. The method as recited in claim 3 wherein said correlating step includes readjusting said reflective surface to compensate for the effect on said highlight density point of said adjusting of said variable density filter.

5. A method of photoreproduction comprising the steps of
   directing the light transmitted from a light source to an adjustable reflective surface;
   disposing an original copy having highlight and shadow points at a copy plane to receive the light reflected from the reflective surface;
   directing the light from the original copy through a variable density neutral filter and a lens to an image plane;
   measuring the light density of the highlight point at the image plane;
   adjusting the reflective surface until the desired light density of the highlight point is obtained;
   measuring the light density of the shadow point at the image plane;
   correlating the light density at the shadow point with the light density at the highlight point by adjusting the variable density neutral filter until a desired light density at the shadow point is obtained;
   positioning a photosensitive material at the image plane; and exposing the photosensitive material to the light at the image plane.

6. The method as recited in claim 5 wherein said step of correlating includes readjusting the reflective surface to compensate for the adjusting of the variable density neutral filter.

7. The method as recited in claim 5 and further including the step of adjusting the light source so that the light transmitted therefrom has a constant Kelvin temperature.

8. A method of photoreproduction comprising the steps of
providing light of adjustable intensity;
directing the light to an original copy having highlight and shadow points;
directing the light from the original copy through a variable neutral density filter and a lens to an image plane;
measuring the light density of the highlight point at the image plane;
adjusting the light intensity until a desired light density of the highlight point is obtained;
measuring the light density of the shadow point at the image plane;
adjusting the variable neutral density filter until a desired light density of the shadow point is obtained;
positioning a photosensitive material at the image plane; and
exposing the photosensitive material to the light at the image plane.

9. The method as recited in claim 8 wherein the light intensity is readjusted after the adjusting of the variable neutral density filter.

10. The method as recited in claim 8 wherein said step of providing light of adjustable intensity includes providing a light source and adjusting the light source so that the light transmitted therefrom has a constant Kelvin temperature.

11. The method as recited in claim 8 wherein said step of providing light of adjustable intensity includes providing a movable reflector and a light source and directing the light from the light source to the reflector.

12. The method as recited in claim 11 wherein said step of adjusting the light intensity includes moving the reflector.

References Cited

UNITED STATES PATENTS

| | | | |
|---|---|---|---|
| 2,462,340 | 2/1949 | Simmon et al. | 355—37 |
| 3,028,483 | 4/1962 | Simmon | 355—70 |
| 3,351,766 | 11/1967 | Weisglass | 355—37 |

NORTON ANSHER, Primary Examiner

M. D. HARRIS, Assistant Examiner

U.S. Cl. X.R.

355—35, 37, 67, 70